(12) United States Patent
Kamsvåg

(10) Patent No.: US 10,457,354 B2
(45) Date of Patent: Oct. 29, 2019

(54) VESSEL HAVING AN IMPROVED HULL SHAPE

(71) Applicant: Ulstein Design & Solutions AS, Ulsteinvik (NO)

(72) Inventor: Øyving Gjerde Kamsvåg, Ulsteinvik (NO)

(73) Assignee: Ulstein Design & Solutions AS, Ulsteinvik (NO)

( * ) Notice: Subject to any disclaimer, the term of this patent is extended or adjusted under 35 U.S.C. 154(b) by 0 days.

(21) Appl. No.: 15/713,538

(22) Filed: Sep. 22, 2017

(65) Prior Publication Data

US 2018/0222552 A1    Aug. 9, 2018

Related U.S. Application Data

(63) Continuation of application No. 15/028,186, filed as application No. PCT/EP2014/071764 on Oct. 10, 2014, now abandoned.

(30) Foreign Application Priority Data

Oct. 11, 2013   (EP) ..................................... 13188280

(51) Int. Cl.
*B63B 1/00* (2006.01)
*B63B 1/08* (2006.01)
(Continued)

(52) U.S. Cl.
CPC ................. *B63B 1/08* (2013.01); *B63B 1/06* (2013.01); *B63B 39/00* (2013.01); *B63B 2241/20* (2013.01); *Y02T 70/128* (2013.01)

(58) Field of Classification Search
CPC .... B63B 1/00; B63B 1/02; B63B 1/04; B63B 1/042; B63B 1/06; B63B 1/08;
(Continued)

(56) References Cited

U.S. PATENT DOCUMENTS

| 3,446,173 A | 5/1969 | Ohcho et al. |
| 3,636,904 A * | 1/1972 | Blanchet ................. B63B 35/08 |
| | | 114/41 |

(Continued)

FOREIGN PATENT DOCUMENTS

| CN | 1655983 A | 8/2005 |
| CN | 101137536 A | 3/2008 |

(Continued)

OTHER PUBLICATIONS

"Vessel Specification MSV Botnica" Oct. 22, 2011—XP055106621.
(Continued)

*Primary Examiner* — Daniel V Venne
(74) *Attorney, Agent, or Firm* — Knobbe Martens Olson & Bear, LLP

(57) ABSTRACT

This relates to vessels in general, but in particular to displacement vessels designed to be exposed from low to medium to high waves. Both for comfort of persons, animals or fragile goods, steady sailing is preferred, without causing the waves slamming in on the vessel hull or excessive pitching of the vessel. This is also the case for service and supply vessels performing operations in relation to offshore or subsea installations. To obtain a solution to the aforementioned issues the present invention provides a vessel, wherein a stern of the vessel extend below a design waterline (Tdwl), and wherein opposite side surfaces of the stern, when seen in an opposite direction of the vessels primary sailing direction, form an acute angle under and above the design waterline (Tdwl) to decrease the vessels displacement in the rear end and are adjoined along at a line of symmetry forming a stern centerline.

9 Claims, 3 Drawing Sheets

(51) Int. Cl.
*B63B 1/06* (2006.01)
*B63B 39/00* (2006.01)

(58) Field of Classification Search
CPC ............ B63B 2001/00; B63B 2001/02; B63B 2001/045; B63B 2001/06; B63B 2241/00; B63B 2241/20
USPC .... 114/56.1, 61.2, 61.27, 61.28, 61.29, 61.3, 114/61.31, 61.32, 271, 288
See application file for complete search history.

(56) References Cited

U.S. PATENT DOCUMENTS

| | | | |
|---|---|---|---|
| 3,690,281 A * | 9/1972 | Gray | B63B 1/08 114/41 |
| 3,850,125 A | 11/1974 | Anders | |
| 3,913,512 A | 10/1975 | Kirby et al. | |
| 3,931,780 A | 1/1976 | Waas | |
| 4,347,801 A | 9/1982 | Colin | |
| 4,506,617 A * | 3/1985 | Waas | B63B 35/12 114/41 |
| 4,942,837 A | 7/1990 | Hellmann et al. | |
| 5,038,695 A | 8/1991 | Varges | |
| 5,218,917 A * | 6/1993 | Harjula | B63B 1/08 114/40 |
| 6,880,477 B2 | 4/2005 | Royle | |
| 2004/0083939 A1 | 5/2004 | Royle | |
| 2005/0034647 A1 | 2/2005 | Amraly | |
| 2011/0267520 A1 | 11/2011 | Pyanet et al. | |

FOREIGN PATENT DOCUMENTS

| | | |
|---|---|---|
| CN | 201390361 Y | 1/2010 |
| DE | 494791 | 3/1930 |
| DE | 568610 | 1/1933 |
| EP | 2 530 008 A1 | 12/2012 |
| GB | 1148037 | 4/1969 |
| JP | 0000110164 C | 12/1934 |
| JP | H08239082 A | 9/1996 |
| JP | 2002002578 A | 1/2002 |
| KR | 20090040556 A | 4/2009 |
| RU | 2 380 268 C2 | 4/2009 |
| RU | 2384456 C2 | 10/2009 |
| WO | WO 0017042 A1 | 3/2000 |
| WO | WO 03/068587 A1 | 8/2003 |
| WO | WO 2011/028512 A2 | 3/2011 |

OTHER PUBLICATIONS

European Search Report for EP 13188280 dated Mar. 11, 2014.
International Search Report for PCT/EP2014/071764 dated Jan. 16, 2015.

* cited by examiner

VESSEL HAVING AN IMPROVED HULL SHAPE

CROSS REFERENCE TO RELATED APPLICATIONS

This application is a continuation of and claims the benefit and priority to U.S. patent application Ser. No. 15/028,186, filed on Apr. 8, 2016, which is a U.S. National Phase Application of PCT International Application Number PCT/EP2014/071764, filed on Oct. 10, 2014, designating the United States of America and published in the English language, which is an International Application of and claims the benefit of priority to European Patent Application No. 13188280.5, filed on Oct. 11, 2013. The disclosures of the above-referenced applications are hereby expressly incorporated by reference in their entireties.

FIELD OF THE INVENTION

The present invention relates to ocean going vessels, and in particular to an ocean going vessel with a hull shape designed to mitigate impacts on the vessel from low to medium to high waves.

BACKGROUND OF THE INVENTION

Steady sailing of vessels, or a steady state of the vessel when anchoring, are providing comfort for persons, animals or fragile goods. In particular, waves providing slamming on the vessel hull, or is providing excessive pitching of the vessel hull, may be a problem in marine operations. This is also the case for service and supply vessels performing operations in relation to offshore or subsea installations. One particular critical operation with respect to offshore situations is when a vessel is supporting a helicopter platform.

A steady motion of the vessel has been considered for aircraft carriers, where aircrafts need to be able to start and land under severe weather conditions. The solution for aircraft carriers appears to be combining the objective of steady sailing, or even in anchored state, with a desire to be able to have as many aircrafts on board as possible, and arriving at making very large vessels having large sea to deck height. In this way the vessel becomes large compared to even high waves. Moreover, because aircraft carriers, when aircrafts have to start and land, normally are facing a direction of incoming wind, this means that the bow of the aircraft carrier will always face the direction of incoming waves, since directions of incoming waves coincides with the direction of incoming wind.

Resorting to such large vessels having large sea to deck height is not a solution for leisure vessels, ordinary transport vessels, service and supply vessels as well as other types of vessels.

Hence, there is a need for an improved hull shape design of a vessel, which may provide more steady sailing with less pitching, slamming of waves and a reduced response to impact of loads from waves hitting the vessel. And not just for sailing, but also when the vessel is anchored, or in a fixed position due to subsea and offshore operations for example. Also, during sailing, it is not always possible to choose an upwind route, so a vessel needs to be steady and stable for the aforementioned reasons under any direction of incoming waves relative to the vessel's sailing direction.

OBJECT OF THE INVENTION

In particular, it may be seen as an object of the present invention to provide a steadier and more stable vessel, where the vessel may be of any desired practical size by providing a stern design reducing drag and impact loads from slamming waves.

It is a further object of the present invention to provide an alternative to the prior art.

Other objects appear from the description, claims and Figures.

SUMMARY OF THE INVENTION

The above described object and several other objects are intended to be obtained in a first aspect of the invention by providing a displacement type of vessel comprising a rear end arrangement, which rear end consists of the part of the vessel backwards from the vessel's midship mark when seen in the vessels primary sailing direction, and which vessel has a transversely symmetrical hull shape about its centerline, wherein a stern of the vessel extend below a design waterline, and wherein opposite side surfaces of the stern when seen in an opposite direction of the vessels primary sailing direction forms an acute angle under and above the design waterline configured to decrease the vessels displacement in the rear end, and wherein the opposite side surfaces of the stern are adjoined along a line of symmetry forming a stern centerline.

When compared to the known art, which e.g. are known to have a stern raised above the design waterline (Tdwl) in order to gradually raise the hull of the vessel at the rear end above the water to obtain a somewhat smooth transition from below the water and above the water. This means that the so-called transom, the area of the hull separating the hull from the water is mostly generally undefined due to the nature of the waves through which the vessel propagates. This is a fact, which technical has an effect of increasing turbulence in an area or volume behind the vessel. Also, normally a flat upright stern, which is transverse to the hull symmetry line, which is often chosen for reasons of cost and simplicity in the manufacture of the vessel. However, these known designs have been found to greatly increase the displacement of the rear end of the vessel, which result in a high degree of a slamming impact and wave impact pressure loads of waves hitting the rear end of the vessel as well as a high degree of pitching or accelerations and retardations due to the high increase in displacement of the rear end of the vessel. Moreover, a risk in very high waves of the vessel is that it may have a surfing-like ride downwards on a wave side surface which should be mitigated. This is all obtained by the features of claim 1 which result in a slender vessel having a smooth, pointed rear end, and thereby having a stern which in majority stays in the water even under high waves, which reduces the risk of surfing. Also, the slender and pointed rear end forms a smooth transition during sailing, which results in less water resistance, i.e. lower drag, which further on reduces the amount of power and fuel needed for sailing. Furthermore, the shape of the vessels rear end will distribute the impact of side wards or backwards incoming waves and will hence result in reduced slamming impact as well as impact pressure loads from incoming waves. The displacement vessel is thus configured to reduce wave impact loads on the displacement vessel.

The centerline of a stern of the vessel above the design waterline (Tdwl) may be sloped forwards in the vessels primary sailing direction. This kind of inverted-type stern further enhance the benefits described above, but also result in particular in reduced slamming of waves coming in from behind, such as during sailing at reduced speed, where the speed of the propagating waves may by similar or higher than the speed of the vessel. Also, this shape of the stern will reduce the displacement of the stern, which will result in less pitching and reduced risk of surfing.

In addition the centerline of a stern of the vessel above the design waterline (Tdwl) may have a convex-shape or be straight. Hereby a decreasing buoyancy increase is provided. Further, the side surfaces of the stern may have a substantially convex configuration. The stern having a convex-shaped or straight centerline and side surfaces forming an acute angle, provides less pitching, slamming of waves and a reduced response to impact loads from waves hitting the stern area of the vessel.

Further, frame lines of the stern may be outwardly sloping from the design waterline (Tdwl) and run upwards in a substantially convex shape gradually back towards the centerline (CL), so as to provide a decreasing buoyancy increase in the upward direction of a the stern in combination with the shape of the centerline of the stern.

The shape of the stern may be outwardly sloping from the design waterline (Tdwl) to create at least a lower part of the stern which is concave, and wherein the shape of the stern runs upwardly in a substantially convex shape, and following gradually and upwardly runs back towards the centerline (CL), so as to provide a decreasing buoyancy increase, in the upward direction of a part of the stern, by a combination of the substantially convex shape of the centerline of the stern and the shape of the stern. These aspects will again reduce the displacement of the stern, which will result in less pitching and reduced risk of surfing.

The centerline of the stern may rise and has a substantially increasing curvature in the forward direction of the vessel in a lower part of the stern and in an upper portion continues to rise with a substantially diminishing curvature. This will have both a bonus effect in medium or low height waves, where a the decreased displacement as described above have a number of benefits, but here also will deflect waves of a higher nature. However, without taking away the overall benefit of this aspect.

A substantially convex shape of the centerline of the stern may have one or more straight portions. This will make it less costly to manufacture the vessel as rounded, double curvature hull parts are more time consuming and complex to manufacture.

A spray board may extend out from an uppermost part of the stern. This will reduce an amount of so-called green water splashing and spraying in over the stern and may cause hazards for persons working on the deck of the vessel.

At an upper portion of the stern located at above midway between the design waterline (Tdwl) and the top of the stern, the vessels have flare angles of the stern are in the range of 5-50 degrees relative to a vertical direction. Also, the stern centerline may have a curvature at an upper portion of the stern upwardly increases from around 0 degrees to around 60 degrees relative to a vertical direction. It is hereby obtained, that when very high forces stemming from the waves and lower part of the hull has reduced pitching and overall operation enhancing general motions, that when the vessel plunges deeply, that there in an increase in displacement which prevent overly deep plunges for reasons of safety.

The vessel may comprises a foreship arrangement, which foreship consists of the part of the ship in front of the vessels midship mark, when seen in the vessels primary sailing direction, and which vessel has a transversely symmetrical hull shape about its centerline (CL) and a substantially conventional form below its design waterline (Tdwl), wherein a centerline of a bow of the vessel by the design waterline (Tdwl) is curved backwards in the vessels primary sailing direction, and wherein a shape of the bow is outwardly sloping from the design waterline (Tdwl) to create at least a lower part of the bow, which is concave, and wherein the shape of the bow runs upwardly in a curved shape, which gradually runs back towards the centerline of the vessel (CL) to create an upper portion, which is convex, so as to provide a decreasing buoyancy increase, in the upward direction of a part of the bow, by a combination of the curvature of the centerline of the stern and the shape of the stern. It is hereby obtained that both the stern and the bow may provide steady sailing, which contributes to the comfort of persons, animals or fragile goods, steady sailing is preferred, in particular without the waves slamming in on the vessel hull or excessive pitching of the vessel. Moreover the vessel according to the invention may be used in case of service and supply vessels performing operations in relation to offshore or subsea installations, where it is necessary to keep the vessel in a stationary position for loading or offloading items or being connected to a subsea installation or facility, or performing a subsea operation. In such situations where the vessel is stationary, the wave direction may change during the operation, whereby both an improved stern as well as an improved bow design may have a combined beneficiary vessel shape. The drawings are merely exemplary, and the upper portion and lower part may be smaller or larger than shown in the drawings, respectively. Finally, the terms "rear end" and stern" are used interchangeably throughout the description and as claimed.

Respective aspects of the present invention may each be combined with any of the other aspects. These and other aspects of the invention will be apparent from and elucidated with reference to the embodiments described hereinafter.

BRIEF DESCRIPTION OF THE FIGURES

The vessel according to the present invention will now be described in more detail with reference to the accompanying figures. The accompanying figures illustrates examples of embodiments of the present invention and is not to be construed as being limiting to other possible embodiments falling within the scope of the attached claim set.

DETAILED DESCRIPTION OF AN EMBODIMENT

Figure 1:
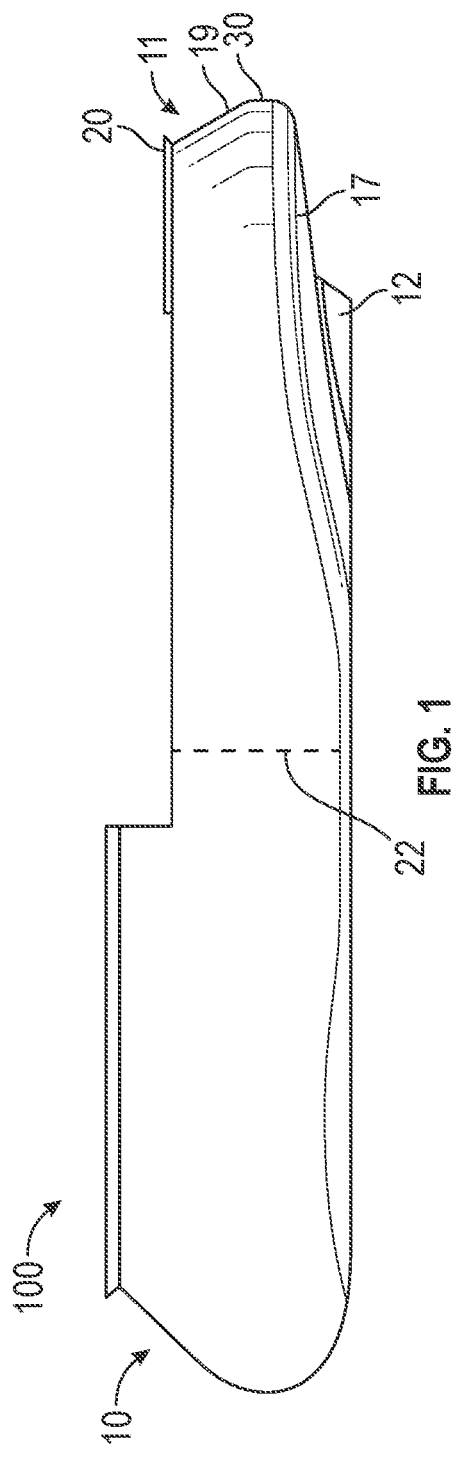
FIG. 1 illustrates a side view of an example of embodiment of the present invention.
Figure 3:
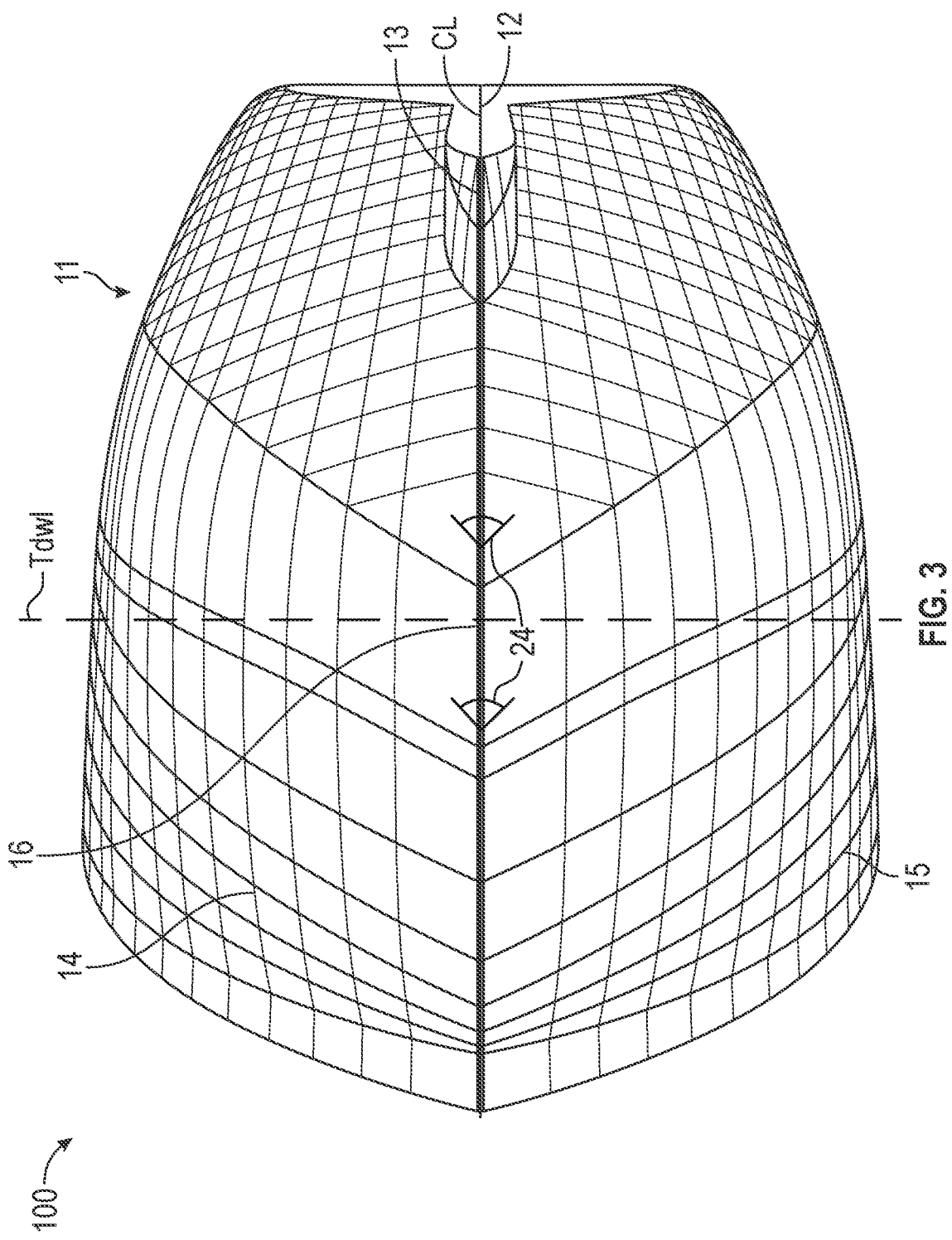
FIG. 3 illustrates a frame line view of a rear part of an example of embodiment of the present invention.
Figure 4:
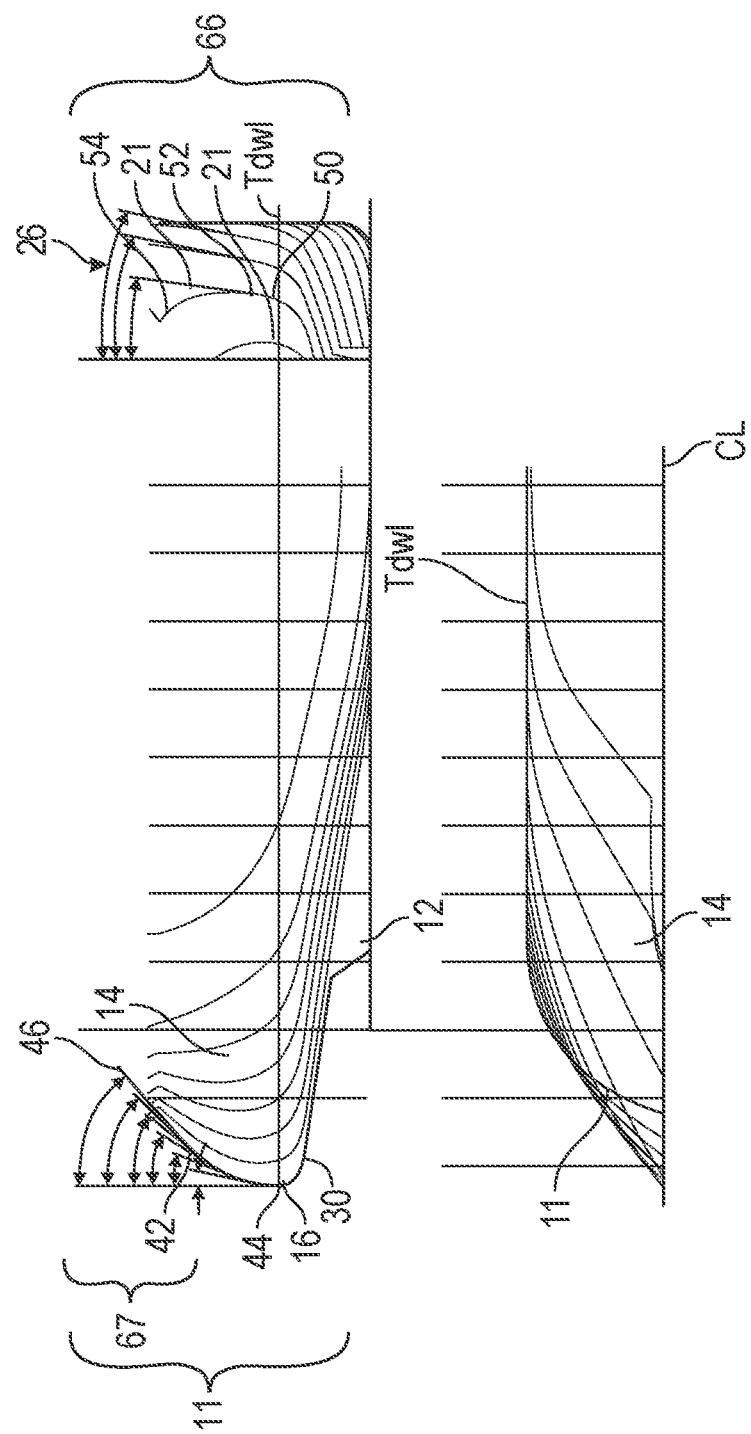
FIG. 4 illustrates a frame line side view of an example of embodiment of the present invention.

FIG. 1 illustrates a side view of an example of a vessel design according to the present invention. The illustrated vessel 100 is a displacement type of vessel comprising a stern 11 and a foreship comprising a bow 10. With reference to FIG. 4 a more detailed illustration of the stern 11 is outlined. The stern 11 is symmetrically shaped around a centerline (CL). The stern is rearward from a midship mark 22 of the vessel 100. A skeg 12 is arranged on a bottom surface of the stern providing an outlet position on the hull of the vessel 100 for a propeller shaft (not illustrated). In alternative embodiments of the present invention, the skeg may have a bulbous shape. In FIG. 3 there is also illustrated an opening 13 wherein the propeller shaft may extend out from the hull into free water below the bottom surface 17 of the vessel 100. As indicated in FIG. 4, the stern may extend below a design waterline (Tdwl).

Figure 2:
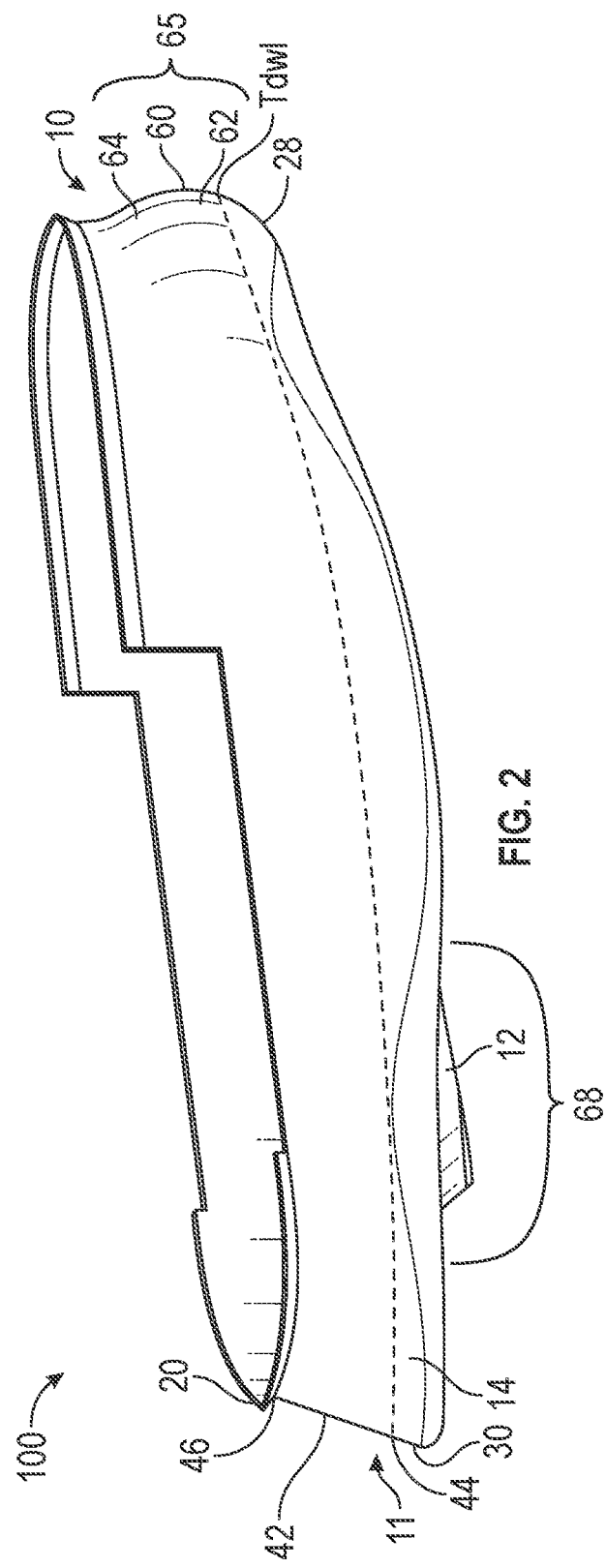
FIG. 2 illustrates a perspective view of an example of embodiment of the present invention.

In FIG. 4 the shape of a stern centerline 16 can include a portion 42 positioned above the design waterline (Tdwl) that is substantially convex. The portion 42 can slope forward in the primary sailing direction of the vessel 100 from an inferior end 44 of the portion to a superior end 46. The centerline may also incorporate straight portions as shown in FIGS. 1 and 2. The portion 42 can be non-concave. FIG. 4 further shows how frame lines 21 of the stern are outwardly sloping from the design waterline (Tdwl) and how the frame lines 21 run upwards in a substantially convex shape and gradually backwards towards the centerline (CL) when the vessel 100 is seen in cross-section. A frame line 21 can include a first portion 50 extending between the design waterline and a point 52 and a second portion 54 extending superiorly from the point 52. The first portion 50 can extend laterally and superiorly from the design waterline, and the second portion 54 can extend medially and superiorly from the first portion 50, thereby providing a convex section 66 of the side surfaces 14 and 15 of the stern.

An aspect of the present invention is to reduce the buoyancy of the stern compared to a more traditional design of sterns in the prior art. In the example illustrated in FIG. 2 it is illustrated how side surfaces 14, 15 are symmetrical about and adjoined along a line of symmetry forming a stern centreline 16, wherein the side surfaces 14, 15 form an acute angle 24 under and above the design waterline Tdwl thereby decreasing the displacement volume of the vessel 100 in the stern 11 compared to many prior art designs.

In another example of embodiment of the present invention the stern centerline 16 from the design waterline Tdwl is sloped forward in the primary sailing direction of the vessel 100. This design contributes also to decrease the displacement volume of the vessel 100 in the stern 11. In addition, the sloping may also provide a changing buoyancy since the sloping is providing a gradual decreasing of the displacement volume of the stern hull in upward direction from the design waterline Tdwl.

In another example of embodiment of the present invention a shape of the stern hull is arranged to be outwardly sloping from the design waterline Tdwl thereby providing that at least a lower part 68 of the stern hull is concave in shape, and wherein the hull shape of the stern hull runs upwardly in a substantially convex hull shape, and is following gradually and upwardly back towards the centerline (CL), so as to provide a decreasing buoyancy increase, in the upward direction of a part of the stern, by a combination of the substantially convex shape of the centerline of the stern and the shape of the stern.

In another example of embodiment of the present invention the centerline 16 of the stern 11 rises and has a substantially increasing curvature in the forward direction of the vessel 100 in a lower part 68 of the stern and in an upper portion 67 continues to rise with a substantially diminishing curvature. Examples of respective possible curvatures are illustrated in FIG. 4. The examples of angles are non-limiting values. In an example of embodiment the stern centerline curvature at an upper portion 67 of the stern increases upwardly from around 0 degrees to around 60 degrees relative to a vertical direction.

It is further possible to arrange one or more straight portions 19 of the stern centerline 16. It is also possible to add a spray board 20 on an uppermost part of the stern.

In another example of embodiment of the present invention an upper portion 67 of the stern at an upper portion located above midway between the design waterline (Tdwl) and the top of the stern, the vessels 100 have flare angles 26 of the stern in the range of 5-50 degrees relative to a vertical direction.

In another example of embodiment of the present invention, the hull below the design waterline (Tdwl) forms a bend or knuckle 30 between a bottom of the hull and the stern, which bend or knuckle 30 is of a smaller curvature than a lowest curvature of the centerline of the stern.

According to another example of embodiment of the present invention the vessel 100 may comprise a foreship or bow 10, wherein the bow 10 consists of the part of the vessel 100 in front of the midship mark 22 of the vessel 100, when seen in the primary sailing direction of the vessel 100, and wherein the vessel 100 has a hull that is transversely symmetrical about its centerline (CL) and a substantially conventional form below its design waterline (Tdwl), wherein a bow centerline 60 of the bow of the vessel 100 by the design waterline (Tdwl) is curved backwards in the primary sailing direction of the vessel 100, and wherein a shape of the bow hull is outwardly sloping from the design waterline (Tdwl) to provide at least a lower part of the bow hull to be concave in shape, and wherein the shape of the bow hull runs upwardly in a curved shape, which gradually runs back towards the centerline of the vessel 100 (CL) thereby providing an upper portion, which is convex, so as to provide a decreasing buoyancy increase, in the upward direction of a part of the bow, by a combination of the curvature of the centerline of the stern and the shape of the stern. A first portion 62 of the bow 10 extends laterally and superiorly from the design waterline and a second portion 64 of the bow 10 extends medially and superiorly from the first portion thereby providing a convex section 65 of the bow 10. It is also within the scope of the present invention that the bow hull of the vessel 100 may comprise a bulbous bow 28 below the design waterline (Tdwl), and/or a knuckle 30 or beak above the design waterline Tdwl.

Embodiments of the present invention may be applied in all kinds of displacement type of vessels. Within this concept it is also important to note that the term "displacement" refers to situations where the stern is submerged into the water. This can also be the case with semi planning ship designs and is therefore within the scope of the present invention.

Embodiments of the present invention are beneficial to use in vessels engaged in service and supply operations of offshore facilities. This includes loading or offloading of items from the vessel to and from an offshore facility. Further, the use of embodiments of the present invention includes stationary subsea operations, during which the vessel is connected to a subsea facility or is involved in repair, maintenance or installation of a subsea facility.

An aspect of the present invention, besides providing better sea going qualities of vessels in low to medium to high wave height, is that it is possible to manufacture vessels with lower sea to deck height when mitigating possible problems with high wave heights facing ocean going vessel designs.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A displacement vessel comprising a stern configured to reduce wave impact loads on the displacement vessel, the stern comprising a section of the displacement vessel rearward from a midship mark of the displacement vessel, wherein the displacement vessel comprises a bow, the bow comprising a section of the ship in front of the midship mark, wherein the displacement vessel comprises a hull being transversely symmetrical about a centerline of the displacement vessel, wherein the stern of the displacement vessel extends below a design waterline, wherein opposite side surfaces of the stern, when seen in a direction opposite of the bow, form an acute angle under and above the design waterline configured to decrease displacement of the displacement vessel in the stern, the opposite side surfaces being adjoined along and symmetrical about a stern centerline, at least a portion of the stern centerline extending above the design waterline, wherein the portion of the stern centerline of the displacement vessel positioned above the design waterline slopes forwards in the direction of the bow of the displacement vessel from an inferior end of the portion of the stern centerline of the displacement vessel positioned above the design waterline to a superior end of the stern centerline of the displacement vessel positioned above the design waterline, wherein the stern is non-concave along the portion of the stern centerline of the displacement vessel positioned above the design waterline, and wherein one or more frame lines of the stern include at least a first portion that extends laterally and superiorly from the design waterline and at least a second portion that extends medially and superiorly from the first portion of the one or more frame lines thereby providing a convex section of the side surfaces of the stern.

2. The displacement vessel according to claim 1, wherein the stern centerline rises and has a substantially increasing curvature in a forward direction of the displacement vessel in a lower part of the stern and in an upper portion continues to rise with a substantially diminishing curvature.

3. The displacement vessel according to claim 1, wherein one or more portions of the stern centerline are straight.

4. The displacement vessel according to claim 1, wherein a spray board arranged in an uppermost part of the stern is extending outwards from the stern.

5. The displacement vessel according to claim 1, wherein at an upper portion located above midway between the design waterline and a top of the stern, the displacement vessel has flare angles of the stern that are in the range of 5-50 degrees relative to a vertical direction.

6. The displacement vessel according to claim 1, wherein an angle between the stern centerline and the vertical axis increases from 0 degrees to 60 degrees between an inferior portion of the stern centerline and a superior portion of the stern centerline.

7. The displacement vessel according to claim 1, wherein the hull below the design waterline forms a bend or knuckle between a bottom of the hull and the stern, which bend or knuckle is of a smaller curvature than a lowest curvature of the centerline of the stern.

8. The displacement vessel according to claim 1, wherein a centerline of the bow of the displacement vessel by the design waterline is curved backwards in the direction of the bow of the displacement vessel, and wherein at least a first portion of the bow extends laterally and superiorly from the design waterline and at least a second portion of the bow extends medially and superiorly from the first portion thereby providing a convex section of the bow.

9. The displacement vessel according to claim 8, wherein the bow comprises a bulbous bow below the design waterline, or a knuckle above the design waterline.

* * * * *